United States Patent [19]

Bly

[11] Patent Number: 5,241,836
[45] Date of Patent: Sep. 7, 1993

[54] PATCH FOR RADIATIVE COOLERS

[75] Inventor: Vincent T. Bly, Springfield, Va.

[73] Assignee: The United States of America as represented by the Administrator of the National Aeronautics and Space Administration, Washington, D.C.

[21] Appl. No.: 8,427

[22] Filed: Jan. 25, 1993

[51] Int. Cl.$^5$ .......................... F25B 23/00; B64G 1/46
[52] U.S. Cl. ............................ 62/467; 165/41;
  165/904; 244/158 R; 244/158 A; 244/163
[58] Field of Search .................. 165/133, 41, 904;
  62/467; 244/158 A, 158 R, 163

[56] References Cited

U.S. PATENT DOCUMENTS

| | | | |
|---|---|---|---|
| 3,205,937 | 9/1965 | Shyffer | 165/904 |
| 3,310,102 | 3/1967 | Trombe | 62/467 |
| 3,422,636 | 1/1969 | Fuschillo et al. | 62/467 |
| 3,422,886 | 1/1969 | Buller | 62/467 |
| 3,428,473 | 2/1969 | Langley | 244/158 A |
| 4,030,316 | 6/1977 | Aronson | 62/467 |
| 4,121,434 | 10/1978 | Annable | 62/467 |
| 4,237,332 | 12/1980 | Winston | 126/690 |
| 4,240,692 | 12/1980 | Winston | 126/648 |
| 4,423,605 | 1/1984 | Petrick et al. | 62/467 |
| 4,507,941 | 4/1985 | Lester et al. | 62/467 |
| 4,580,748 | 4/1986 | Dalby | 244/158 R |
| 4,586,350 | 5/1986 | Berdahl | 62/467 |
| 4,624,113 | 11/1986 | Hull et al. | 62/467 |
| 4,669,685 | 1/1987 | Dalby | 244/158 R |
| 5,086,828 | 2/1992 | Ewert | 165/1 |

FOREIGN PATENT DOCUMENTS

| | | | |
|---|---|---|---|
| 2605287 | 4/1988 | France | 244/158 R |
| 2-4299 | 1/1990 | Japan | 244/163 |
| 2-81499 | 12/1991 | Japan | 244/163 |
| 387828 | 2/1933 | United Kingdom | 165/904 |

Primary Examiner—John Rivell
Assistant Examiner—L. R. Leo
Attorney, Agent, or Firm—Paul S. Clohan, Jr.; R. Dennis Marchant; Guy M. Miller

[57] ABSTRACT

A unique structure for constructing the emissive patch of a spaceborne radiative cooler is shown. The structure has very high emissivity for all angles up to a designed-in maximum angle and near zero emissivity for greater angles. The structure also allows the use of high emissivity, nonconducting paints while fully complying with the NASA Electrostatic Discharge Susceptibility requirements for spacecraft. To accomplish these tasks, two previous disadvantages of prior art methods are addressed; eliminating background thermal radiation sources and problems concerning the high emissivity paints used in association with the black body radiator. A reflector consisting of an array of parabolic concentrators is separated from a black body element by an electrically conductive spacer. The concentrators serve to limit the field of view while the conductive spacer eliminates the need to use a conductive paint on the emissive element.

14 Claims, 4 Drawing Sheets

PATCH FOR RADIATIVE COOLERS

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to radiative coolers in general and specifically to a means of increasing the efficiency of a radiative cooler.

BACKGROUND ART

As space-borne instrumentation increases in sophistication, technological advances must be made in order to meet mission objectives and needs. While heat pipes and cryogenic coolers frequently have been employed for close-in missions, a survey of cryogenic sensor cooling needs for future space missions, particularly for deep space operations, has identified numerous missions with formidable cooling requirements for which present technology is inadequate.

Radiative coolers offer a reliable, no power method of cooling spacecraft instrument sensors. They consist, in their simplest form, of a high thermal conductivity path from the spacecraft sensor to a blackened patch which radiates heat from the sensor into the relatively cold background of space. The structure disclosed here addresses two problems common to most radiative coolers: loss of cooling capacity due to warm objects within the radiative field-of-view, and incompatibility of the blackest paints with Electrostatic Discharge Susceptibility (EDS) requirements.

STATEMENT OF THE INVENTION

It is therefore an object of the present invention to increase the efficiency of radiative coolers.

Another object of the present invention is to prevent loss of cooling capacity due to warm objects within the radiative cooler's field-of-view.

A further object of the present invention is to overcome the incompatibility of the blackest paints with Electrostatic Discharge Susceptibility requirements.

These and other objects are achieved by providing a unique structure for constructing the emissive patch of a spaceborne radiative cooler. The structure has very high emissivity for all angles up to a designed-in maximum angle and near zero emissivity for greater angles. The structure also allows the use of high emissivity, nonconducting paints while fully complying with the NASA Electrostatic Discharge Susceptibility requirements for spacecraft. To accomplish these tasks, two previous disadvantages of prior art methods are addressed. The first aspect relates to eliminating background thermal radiation sources and the second is concerning the high emissivity paints used in association with the black body radiator. The rate of radiation from a black body is a function of the temperature difference between a radiating element and its surroundings. Ideally, the surroundings should be limited to objects at or near absolute zero. To this end, the invention presents the use of reflectors which limit the field of view of the radiating element and restricts the field of view to an empty region of space. The reflector consists of an array of compound parabolic concentrators (also known as "CPC's" or "Winston Cones) which is separated from a black body element by an electrically conductive spacer. The concentrator serves to limit the field of view while the conductive spacer eliminates the need to use a conductive paint on the emissive element.

DETAILED DESCRIPTION OF THE INVENTION

Figure 1:
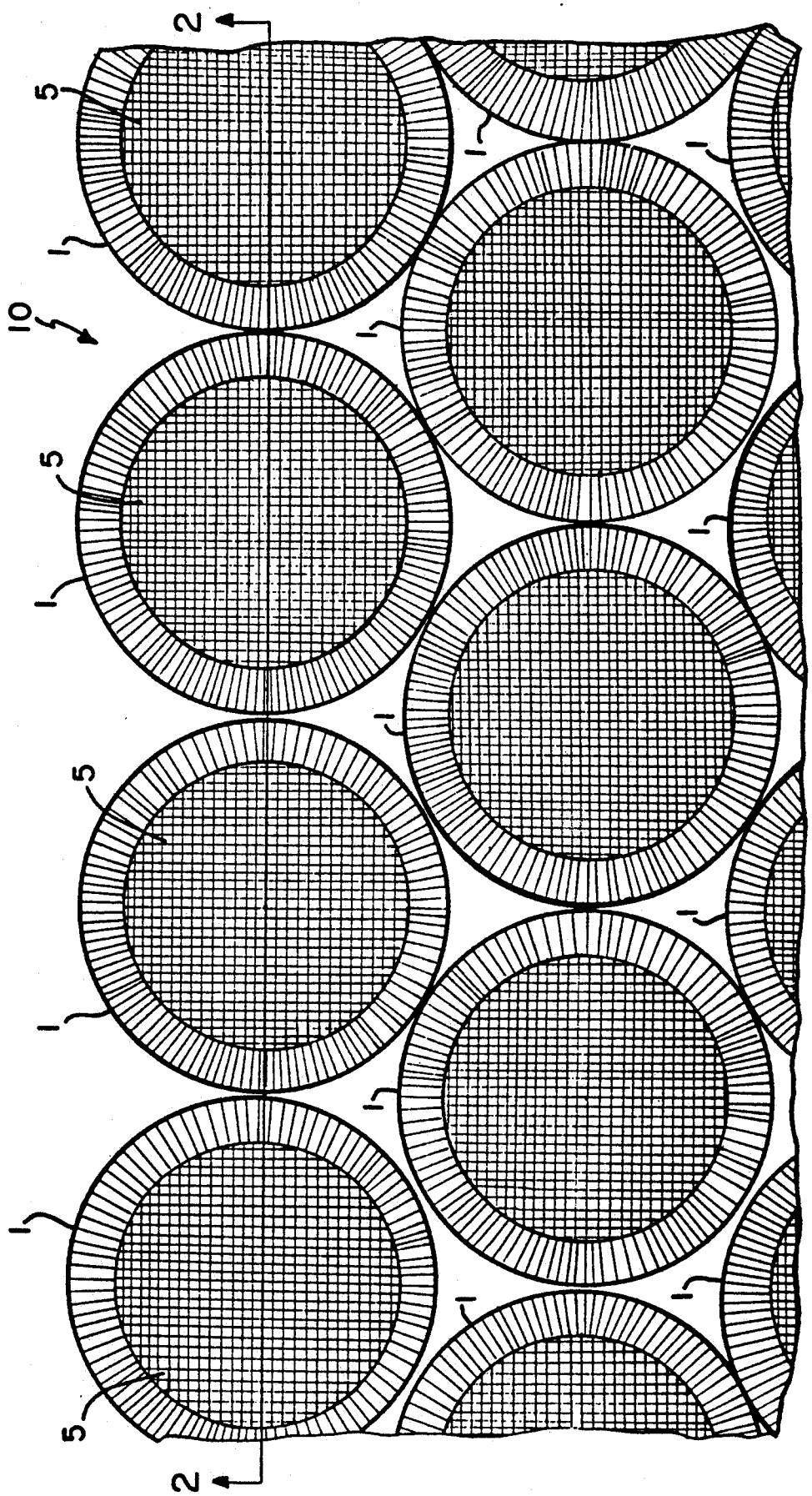
FIG. 1 is a top view of a portion of a compound parabolic concentrator patch according to the present invention.
Figure 2:
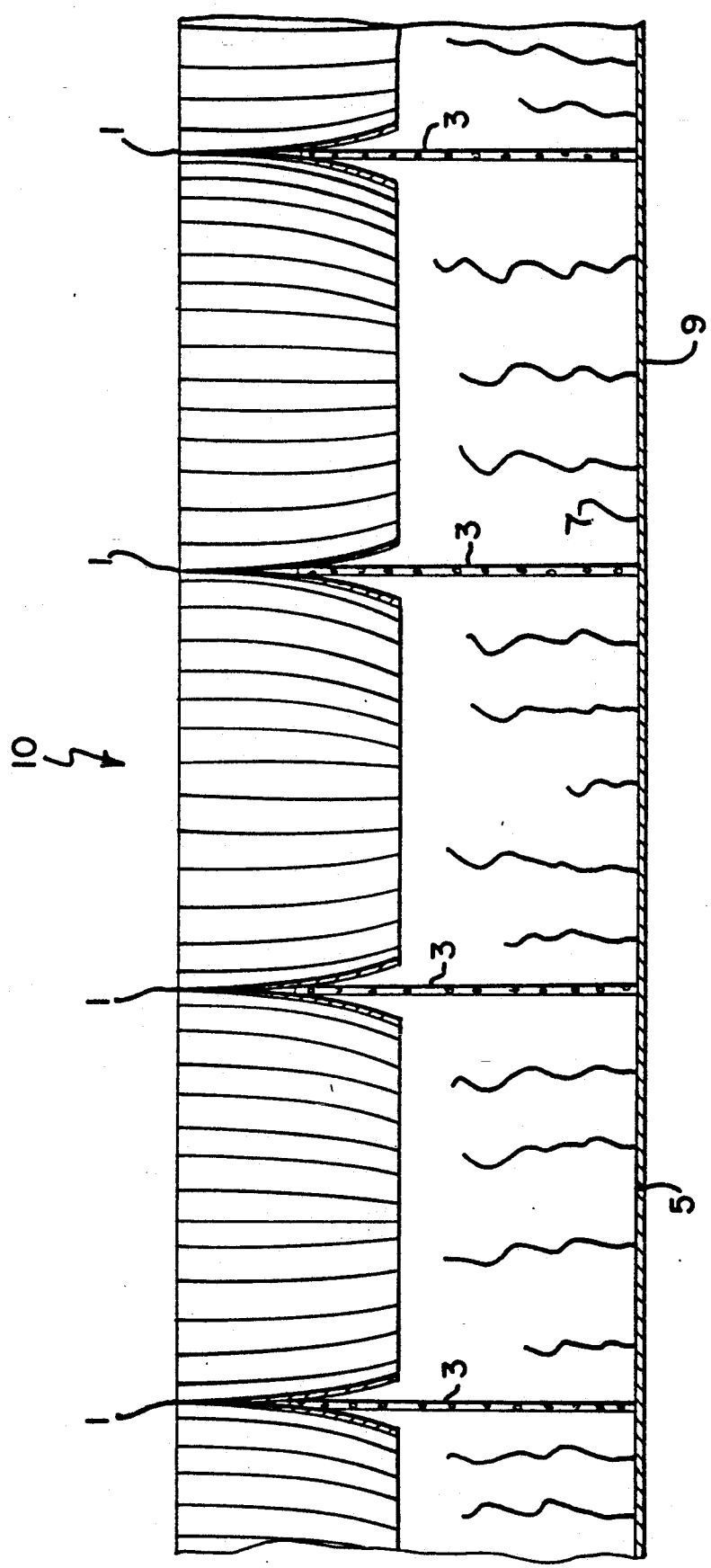
FIG. 2 is a cross sectional view of the patch for radiative coolers containing compound parabolic concentrators along line 2—2 of FIG. 1.

Referring now to FIG. 1, a top view of a portion of emissive patch 10 for radiative coolers containing several compound parabolic concentrators 1 is shown. The present invention is a three element structure; a 2-dimensional array of concentrators 1 (preferably compound parabolic concentrators (CPC's)); a thick perforated plate 3 acting as a spacer (see FIG. 2); and a thin, flat back plate 5. The primary function of each concentrator 1 is to constrain the radiative field-of-view of patch 10 to a specific maximum angle from the normal to the plane of patch 10. In the embodiment shown, the radiation angle is ±60°. Each concentrator 1 also acts as a grounded, electrically conducting shield, necessary to meet EDS requirements (as discussed below). The function of spacers 3 (FIG. 2) is to position back plate 5 at least one concentrator input aperture diameter behind the front surface of concentrators 1. This is also to meet EDS requirements. Front surface 7 of back plate 5 is blackened and emits and absorbs radiation with the space background through concentrators 1. Back surface 9 of back plate 5 is highly reflective to minimize radiative exchange with the (comparatively) warm spacecraft and its instruments.

Figure 3:
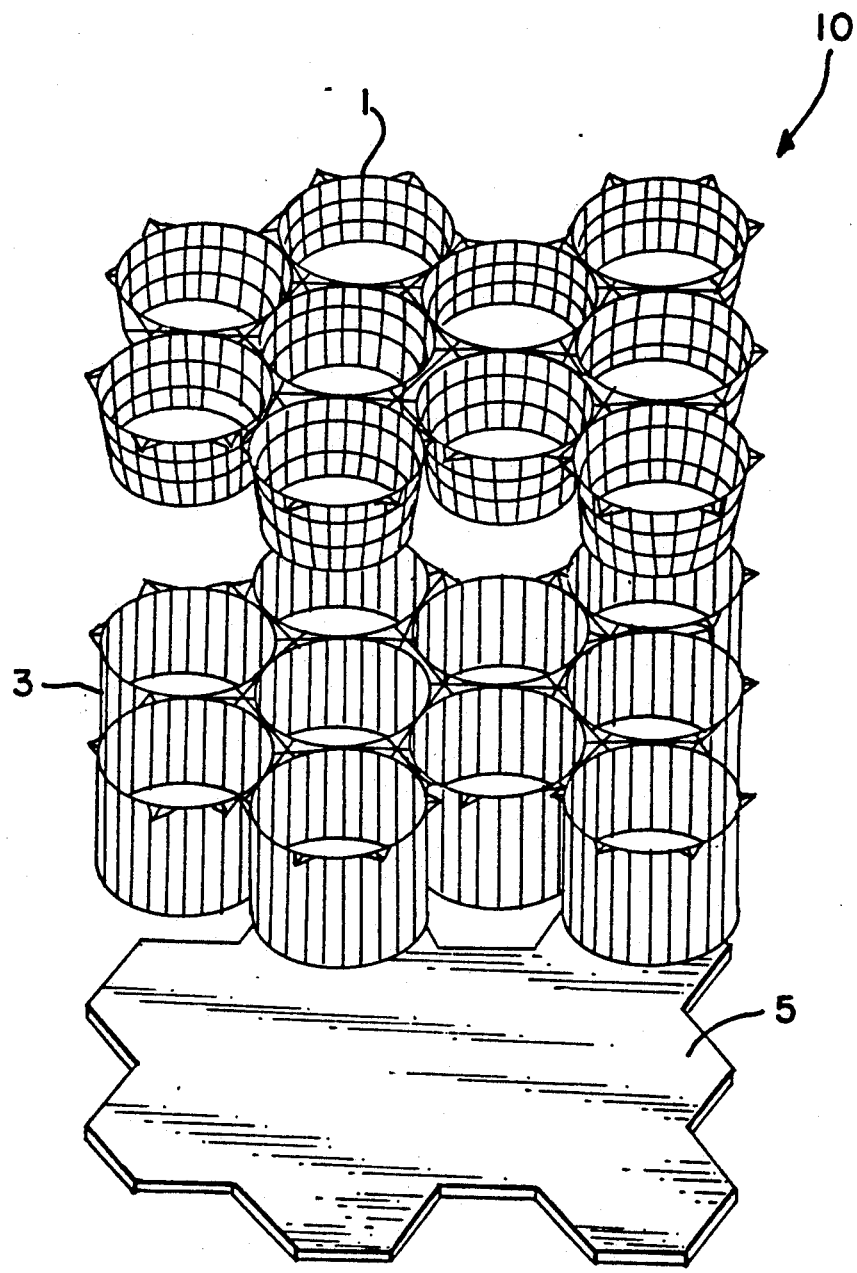
FIG. 3 is an exploded view of a compound parabolic concentrator patch according to the present invention.

In one embodiment, each concentrators is electroformed out of nickel. Nickel has the advantages of being relatively strong, easy to electroform, and easy to electropolish. Each concentrator 1 is electropolished and coated in specular gold. Gold is the highest reflective metal for the infrared wavelengths of interest. Each concentrator 1 can be a right circular cone, a pyramid, or a CPC. CPCs are preferable as they provide the most efficient concentration and the sharpest angular cutoff. A hex-close-pack array can be used to maximize the fill factor with circular aperture concentrators (see FIG. 3).

Each spacer must be an electical conductor. The overall structure is designed to meet EDS requirements by meeting section 3.3.8.1.3, part d) of JPL's Environmental Design Requirements, dated 14 November 1991. This part requires that charged/nonconducting surfaces must be recessed below the grounded spacecraft surface according to the formula:

$$\frac{d}{A^{**1/2}} > 1.0 \quad \text{where}$$

d = depth to nonconducting surface
A = area of the aperture

The height or thickness of each spacer 3 must be such that the assembled structure meets this requirement. The only radiometric requirement is that the sides of spacer 3 be smooth and vertical and that the surface specularly reflect what it does not absorb.

Front surface 7 of back plate 5 should have as high an emissivity as possible. An ultra black paint, such as Ames 24E, can be used. Note that, because of the geometry of the overall structure, the black paint does not need to be electrically conducting to meet EDS requirements. Back side 9 of back plate 5 should be smooth and coated with a very low emissivity material, such as specular gold.

One method of construction is to bond the elements of patch 10 together with electrically conductive epoxy. It is also critical that each concentrator 1 be electrically connected to the spacecraft ground. Since the mechanical support around the periphery of patch 10 must be a good thermal insulator, it will be most practical to run a small diameter wire from the spacecraft ground to the metal concentrator 1. To minimize thermal conduction along the wire, it should be made from a low conductivity material such as stainless steel or manganese.

Figure 4:
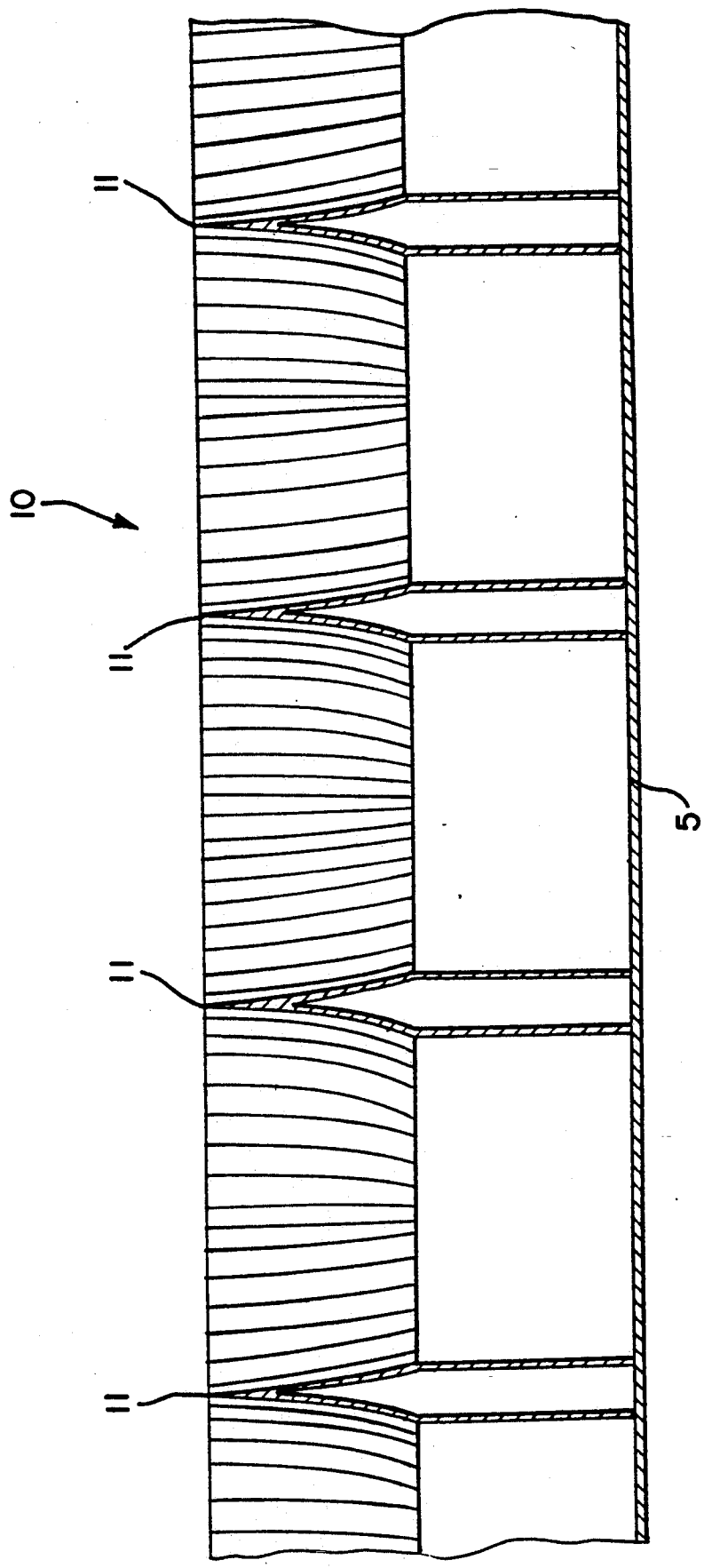
FIG. 4 is a cross sectional view of an alternative embodiment of a compound parabolic concentrator patch according to the present invention.

An alternative embodiment of patch 10 structure is shown in FIG. 4. Here, the electroformed front element 11 acts as both the concentrator and spacer.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. An emissive patch for a spacecraft radiative cooler having a radiative field of view comprising:
a plurality of concentrators to constrain said radiative field of view of said patch;
a thin flat plate attached to said spacecraft; and
a plurality of thermally and electrically conductive spacers between said plurality of concentrators and said thin flat plate.

2. The device of claim 1 wherein said concentrators are compound parabolic concentrators.

3. The device of claim 2 wherein said plurality of concentrators are arranged as a hexagonal close pack array.

4. The device of claim 3 wherein said compound parabolic concentrators limit the radiation angle to ±60°.

5. The device of claim 4 wherein said concentrators are electroformed out of nickel and coated in specular gold.

6. The device of claim 1 wherein said concentrators are right circular conic concentrators.

7. The device of claim 1 wherein said concentrators are a pyramidic concentrators.

8. The device of claim 1 wherein said spacers position said flat plate at least one concentrator input aperture diameter behind a front surface of said concentrators.

9. The device of claim 1 wherein the sides of said spacers are smooth and vertical with a surface that specularly reflects what it does not absorb.

10. The device of claim 1 wherein a front surface of said flat plate is blackened and a back surface of said flat plate is highly reflective.

11. The device of claim 10 wherein said front surface of said flat plate is blackened with an ultra black paint.

12. The device of claim 10 wherein said back surface of said flat plate is made highly reflective by coating with specular gold.

13. The device of claim 1 wherein said plurality of concentrators, said thin flat plate, and said plurality of spacers are bonded together with electrically conductive epoxy.

14. The device of claim 1 wherein said plurality of concentrators and said like plurality of spacers are joined thereby forming a single element.

* * * * *